United States Patent [19]
Cairns et al.

[11] 3,886,172

[45] May 27, 1975

[54] MANUFACTURE OF BIPYRIDYLIUM SALTS

[75] Inventors: John Francis Cairns; John Reginald Case, both of Runcorn, England

[73] Assignee: Imperial Chemical Industries Limited, London, England

[22] Filed: Feb. 10, 1972

[21] Appl. No.: 225,271

[52] U.S. Cl............... 260/296 D; 71/94; 260/290 R
[51] Int. Cl............................................ C07d 31/42
[58] Field of Search................................ 260/296 D

[56] References Cited
UNITED STATES PATENTS 3,787,426   1/1974   Colchester et al............. 260/296 D

FOREIGN PATENTS OR APPLICATIONS 963,441   7/1964   United Kingdom............. 260/296 D
1,016,541   1/1966   United Kingdom............. 260/296 D
1,030,154   5/1966   United Kingdom............. 260/296 D

OTHER PUBLICATIONS

Malinovskii, Epoxides And Their Derivatives, frontispage and pages 249 to 250, Daniel Davey and Co. Inc., NY (1965).

Paquin "Epoxydverbindungen and Epoxyhardze," frontispage and pages 38 to 40, Springer-Verlag, Berlin, Germany (1958).

Klingsberg, Pyridine and its Derivatives, Part Two, frontispage, pages 224 to 231, Interscience Publishers, Inc. NY (1961).

*Primary Examiner*—John D. Randolph
*Attorney, Agent, or Firm*—Cushman, Darby & Cushman

[57] ABSTRACT

A process is provided for the manufacture of di-(hydroxyalkyl) bipyridylium salts by interacting pyridine with an alkali-metal, preferably, the reaction is carried out in liquid ammonia and in the substantial absence of oxygen. The interaction products forms the corresponding alkali-metal salt of tetrahydro-bipyridyl. The tetrahydro-bipyridyl is reacted with an alkylene oxide to yield the corresponding di-(hydroxyalkyl)-tetrahydro-bipyridyl or salt thereof, which is in turn oxidized to the corresponding di-(hydroxyalkyl) bipyridylium salt.

10 Claims, No Drawings

MANUFACTURE OF BIPYRIDYLIUM SALTS

This invention relates to the manufacture of 1,1'-disubstituted-4,4'-bipyridylium salts and particularly to a process for the manufacture of 1,1'-disubstituted-1,1',4,4'-tetrahydro-4,4'-bipyridyls and their conversion into the corresponding 1,1'-disubstituted-4,4'-bipyridylium salts which are useful herbicides.

According to the present invention we provide a process for the manufacture of a salt of a 1,1'-disubstituted-1,1',4,4'-tetrahydro-4,4'-bipyridyl which comprises reacting a metal-pyridine interaction product with an alkylene oxide.

It is preferred to carry out the reaction under substantially anhydrous conditions and the substantial absence of molecular oxygen is advantageous since oxygen tends to result in the formation of unwanted byproducts.

The reaction will usually be carried out in the presence of a liquid diluent medium, preferably one which is a solvent for the metal-pyridine interaction product. In this case an aprotic solvent is most suitable, for example liquid ammonia and polar aprotic organic solvents, for example dimethyl formamide, diglyme or pyridine, ammonia being the preferred solvent. The solvent preferably should be substantially anhydrous although a trace of water can be tolerated. The metal-pyridine interaction product conveniently may be employed in the form of a suspension in which it has been prepared, without first isolating it.

The temperature at which the reaction is carried out is not critical and may vary over a wide range, for example from −120°C to 200°C, although the temperature may be dependent to some extent upon the solvent in which the reaction is carried out. Preferably the temperature is not greater than 150°C. Thus, for example, if liquid ammonia is employed as solvent the temperature of the reaction normally will not be above −33°C although higher temperatures may be employed if the reaction is carried out under superatmospheric pressure. The alkylene oxide usually will be employed in the liquid phase and temperatures in excess of the boiling point of the alkylene oxide normally will not be employed unless the reaction is carried out under superatmospheric pressure. Thus, for example, if ethylene oxide is employed at atmospheric pressure, the temperature normally will not exceed 10°C and if propylene oxide is employed the temperature normally will not exceed 35°C.

The metal-pyridine interaction product can be produced by any known method, for example by reacting pyridine or a substituted pyridine with a dispersion of an alkali-metal, especially sodium, at a temperature of from 50°C to 120°C as described in U.K. Pat. Specification No. 963,441; with a solution of an alkalimetal, especially sodium, in liquid ammonia as described in U.K. Pat. Specification No. 1,030,154; with magnesium as described in U.K. Pat. Specification No. 956,854; or with aluminium as described in U.K. Pat. Specification No. 1,016,541. Production of a sodium-pyridine interaction product by reacting pyridine or an alkyl pyridine with a solution of sodium in liquid ammonia is advantageous in that the resulting solution of the sodium salt of a tetrahydro-4,4'-bipyridyl in liquid ammonia can be employed directly in the process of the present invention. Examples of substituents which may be present in the pyridine nucleus are alkyl, alkoxy, aryl, aryloxy, dialkylamino groups and halogen atoms.

The alkene oxide normally will contain from two to ten carbon atoms although alkene oxides containing more than ten carbon atoms can be employed if desired. We prefer to employ an alkene oxide containing from two to four carbon atoms, especially ethylene oxide. The alkylene oxide may contain substituents, for example halogen atoms. The alkene oxide is usually added in the form of a liquid (which may necessitate carrying out the reaction under superatmospheric pressure) and preferably it should be substantially anhydrous.

The 1,1'-disubstituted-1,1',4,4'-tetrahydro-4,4'-bipyridyl derivative obtained by the process of the invention is anionic in character, and it can be converted by oxidation into the corresponding 1,1'-disubstituted-4,4'-bipyridylium salts. A variety of oxidising agents may be employed for this oxidation which are hydrogen acceptors and which have a redox potential in water more positive than −1.48 volts as compared with the saturated calomel electrode. A process for the oxidation of 1,1'-disubstituted-tetrahydro-4,4'-bipyridyls using such oxidising agents is described and claimed in U.K. Pat. Specification No. 1,073,081. Examples of suitable oxidising agents are quinones, sulphur and inorganic oxyacid anhydrides, for example sulphur dioxide.

However, we have found that the yield of the bipyridylium salt is greatly improved if the tetrahydrobipyridyl derivative, which is anionic, is protonated or alkylated prior to its oxidation. Protonation may be effected by means of any proton source, e.g. water, an alcohol, for example methanol, an anhydrous aprotic acid (organic or inorganic) or an ammonium salt thereof. We prefer to employ a non-aqueous proton source under substantially anhydrous conditions in the substantial absence of molecular oxygen. An excess of the proton source over the stoichiometric amount preferably is avoided. Conveniently an ammonium salt is used which is soluble in the reaction medium in which the tetrahydrobipyridyl derivative has been prepared so that the derivative need not be isolated prior to protonation thereof. An example of a suitable ammonium salt, which is especially suitable for use in liquid ammonia, is ammonium nitrate. A suitable alkylating agent is dimethyl sulphate. The resulting 1,1'-di(hydroxy alkyl)-1,1',4,4'-tetrahydro-4,4'-bipyridyl or 1,1'-di(alkoxyalkyl)-1,1',4,4'-tetrahydro-4,4'-bipyridyl may be oxidised to the corresponding 1,1'-di(hydroxyalkyl)-4,4'-bipyridylium salts or 1,1'-di(alkoxyalkyl)-4,4'-bipyridylium salt as hereinbefore described in respect of 1,1'-disubstituted tetrahydrobipyridyl derivatives. A particularly useful oxidising agent for effecting oxidation is sulphur dioxide.

The temperature at which protonation of the anionic 1,1'-disubstituted tetrahydrobipyridyl derivative is carried out may vary within wide limits depending on the solvent employed and may be, for example, from −120°C to 100°C, if necessary under superatmospheric pressure.

The 1,1'-disubstituted-4,4'-bipyridylium salt may be isolated from the reaction mixture in conventional manner, for example by adding water or a dilute solution of an acid for example hydrochloric acid or acetic acid followed by separation of the resulting aqueous layer and evaporation of the water. Normally, however, the bipyridylium salt will not be isolated from its aqueous solution in which form it is usually employed as a herbicide, if desired after suitable formulation with a wetting agent.

The invention is illustrated but in no way limited by the following Examples in which all reagents were dried and freed from oxygen before use.

EXAMPLE 1

A suspension of the sodium salt of tetrahydro-4,4'-bipyridyl in liquid ammonia was prepared by reacting pyridine (3.85g ) with a solution of sodium (1.328g) in liquid ammonia (200 mls) at −35°C for 30 minutes under an atmosphere of nitrogen gas.

Ethylene oxide (ca. 10 mls) was distilled into the suspension of the resulting tetrahydrobipyridyl derivative in liquid ammonia, under an atmosphere of nitrogen gas. After a period of 30 minutes from the final addition of ethylene oxide, ammonium nitrate (3.89g) was added to the mixture (under nitrogen). The resulting solution of 1,1'-di(2-hydroxyethyl)-1,1',4,4'-tetrahydro-4,4'-bipyridyl was filtered into diglyme (200 mls) and the ammonia was distilled from the mixture until the temperature of the mixture reached 0°C. Anhydrous sulphur dioxide (ca. 10g) was then distilled into the mixture, under nitrogen.

The resulting suspension contained the 1,1'-di(hydroxyethyl)-4,4'-bipyridylium cation which was estimated colorimetrically (after reduction with sodium dithionite in water at pH 9.2). The analysis indicated the presence of 3.4g of the bipyridylium salt, corresponding to a reaction efficiency of 45% based on pyridine fed to the reaction. no attempt was made to recover unchanged pyridine.

EXAMPLE 2

The procedure of Example 1 was repeated until the ethylene oxide addition was completed. After a period of 30 minutes from the final addition of ethylene oxide the mixture was poured into diglyme (200 mls) under an atmosphere of nitrogen and the ammonia was distilled off until the temperature of the mixture reached 0°C. Sulphur dioxide (ca. 10g) was then distilled in (under nitrogen) and the resulting suspension was analysed for 1,1'-di(2-hydroxyethyl)-4,4'-bipyridylium salt. The reaction efficiency was 12% based on pyridine fed to the reaction. No attempt was made to recover unreacted pyridine.

EXAMPLE 3

Sodium (3.5g) and pyridine (10.5g) were interacted in liquid ammonia at −40°C in the absence of oxygen and the interaction product was treated with ethylene oxide (30 mls) and then with methanol (5.5 mls). The ammonia was allowed to evaporate and was replaced by diglyme. The mixture was then stirred and sulphur dioxide gas was passed into it. The temperature was maintained below 25°C. The resulting yellow solid was dissolved in water and the aqueous solution was analysed colorimetrically. 5.5g of 1,1'-di(2-hydroxyethyl)-4,4'-bipyridylium ion was produced, representing a reaction efficiency of 43% based on pyridine fed.

What we claim is:

1. A process for the manufacture of a 1,1'-di(hydroxyalkyl)-4,4'-bipyridylium salt wherein the hydroxyalkyl substituents each contain from 2 to 10 carbon atoms which comprises the steps of:
    1. interacting pyridine with an alkali metal in liquid ammonia in the absence of oxygen to yield a solution of the corresponding alkali-metal salt of 1,1',-4,4'-tetrahydro-4,4'-bipyridyl;
    2. reacting the solution thus obtained with an alkylene oxide containing from 2 to 10 carbon atoms to yield a 1,1'-di(hydroxyalkyl)-1,1',4,4'-tetrahydro-4,4'-bipyridyl or an alkali-metal salt thereof; and
    3. oxidising the said 1,1'-di(hydroxyalkyl-1,1',4,4'-tetrahydro-4,4'-bipyridyl or alkali-metal salt thereof.

2. A process according to claim 1 wherein the product of step (2) is protonated by treatment with a proton source from the group consisting of alcohols, protic acids, water and ammonium salts thereof, prior to the oxidation of step (3).

3. A process as claimed in claim 1 wherein the reaction is carried out under substantially anhydrous conditions.

4. A process as claimed in claim 1 wherein the reaction is carried out in the presence of a liquid diluent which is a solvent for the 1,1',4,4'-tetrahydro-4,4'-bipyridyl.

5. A process as claimed in claim 1 wherein a polar aprotic diluent is employed.

6. A process as claimed in claim 1 wherein the reaction of step (1) is carried out at a temperature below −33°C.

7. A process as claimed in claim 1 wherein the alkylene oxide is employed in the liquid phase and the reaction of step (2) is carried out at a temperature below the boiling point of the alkylene oxide.

8. A process as claimed in claim 1 wherein the alkylene oxide contains from 2 to 4 carbon atoms.

9. A process as claimed in claim 1 wherein the product of step (2) is treated with an alkylating agent to process a 1,1'-di(alkoxyalkyl)-1,1'4,4'-tetrahydro-4,4'-bipyridyl, prior to the oxidation of step (3).

10. A process as claimed in claim 9 wherein the alkylating agent is dimethyl sulphate.

* * * * *